US006936788B2

(12) United States Patent
Dietrich

(10) Patent No.: US 6,936,788 B2
(45) Date of Patent: Aug. 30, 2005

(54) STRIPPING OF FFCS

(75) Inventor: Jörn Dietrich, Siegendorf (AT)

(73) Assignee: I & T Innovation Technology Entwicklungs-und Holding Aktiengesellschaft, Siegendorf (AT)

( * ) Notice: Subject to any disclaimer, the term of this patent is extended or adjusted under 35 U.S.C. 154(b) by 20 days.

(21) Appl. No.: 10/654,519

(22) Filed: Sep. 3, 2003

(65) Prior Publication Data

US 2004/0118822 A1 Jun. 24, 2004

(30) Foreign Application Priority Data

Sep. 3, 2002 (EP) ............................................ 02450195

(51) Int. Cl.$^{7}$ ........................ B23K 26/40; B23K 26/067

(52) U.S. Cl. ............................ 219/121.69; 219/121.68; 219/121.76

(58) Field of Search ....................... 219/121.68, 121.69, 219/121.76; 174/117 F

(56) References Cited

U.S. PATENT DOCUMENTS 4,671,848 A * 6/1987 Miller et al. .................. 216/65
4,818,322 A 4/1989 Morino et al. ........... 156/272.8
4,931,616 A * 6/1990 Usui et al. ............. 219/121.68
4,970,367 A * 11/1990 Miller ................... 219/121.68
5,115,555 A 5/1992 Olsson et al. .............. 29/566.3
5,887,324 A * 3/1999 Wu ........................... 29/25.42
5,940,963 A 8/1999 Tolmie et al. ................ 29/828
5,954,974 A * 9/1999 Broer et al. ................... 216/2
6,509,547 B1 * 1/2003 Bernstein et al. ...... 219/121.68
6,563,082 B2 * 5/2003 Terada et al. .......... 219/121.72
6,608,256 B2 * 8/2003 Suzuki et al. ............ 174/117 F

* cited by examiner

*Primary Examiner*—Geoffrey S. Evans
(74) *Attorney, Agent, or Firm*—Merchant & Gould

(57) ABSTRACT

A method for stripping flat cables, so-called FFCs, particularly for extruded FFCs, by using laser beams and devices for performing the method. Two coaxial laser sources pointing toward each other are used for removing the extruded material, the flat cable being located essentially in the plane of symmetry between the two laser sources, and the two laser sources being activated in an alternating manner. Preferably, a laser beam-impervious cover is arranged between the flat cable and the inactive laser source at least during the activation of one of the laser sources.

6 Claims, 2 Drawing Sheets

STRIPPING OF FFCS

Figure 1:
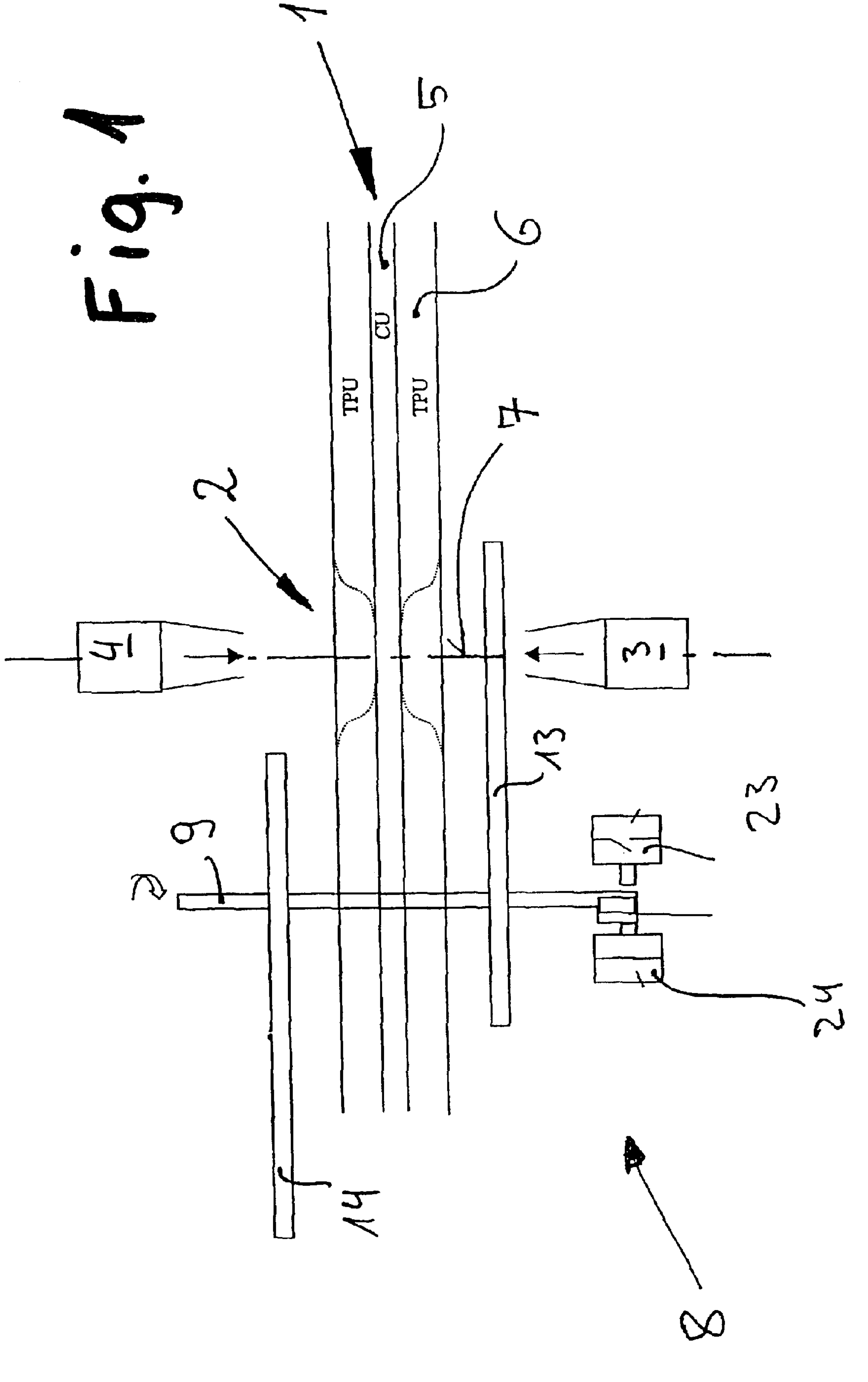

The invention concerns the stripping of flat, flexible cables, so-called FFCs.

FFCs are being used increasingly in industry and particularly in automobile construction instead of round cables, because they can be processed by automated machines. In addition, they permit electrically conductive connections to be created in the form of branch points, wherein the insulating material around the conductors to be contacted is removed, the two FFCs are fitted to each other, the conductors are interconnected, and the connection points are then insulated with a sealing material or insulating adhesive tape or the like. In addition, it is necessary to form windows in the end region of each FFC in order to attach plugs, sockets, contacts, or the like.

Such windows are formed in the prior art by a combination of a stamping process with a peeling process or a metal-cutting process, which can be complicated and unpleasant due to the resulting extruded material particles. It has already been attempted to manufacture the windows with lasers, but this leads to negative effects on the surface of the conductors, which then must be treated chemically before further processing is possible. The required chemical treatment makes it necessary in the fabrication process to provide a processing station that handles liquid chemicals, which are provided via corresponding suction and discharge devices, and then a drying and inspection step must follow in order to ensure that the resulting FFCs are defect free. Such a station is a foreign body in an otherwise electronic production path operating with lasers and the like and therefore it is to be avoided if possible.

For miniaturized coaxial cables, as described in U.S. Pat. No. 5,940,963 A, it is known, for the production of end plugs or terminals, to soften the inner insulation by means of two laser beams along a narrow region, after the removal of the outer insulation and the fixing of the exposed shielding, so that as a result, the endpiece of the inner insulation can be pulled off mechanically.

From U.S. Pat. No. 4,818,322 A it is known to lay an electrical cable surrounded with an adhesive material on an electrically insulated substrate with the aid of a guide pin and to connect the cable to the substrate by means of two suitably focused laser beams, which activate the adhesive material.

From U.S. Pat. No. 5,115,555 A it is further known to remove the insulation of FFCs in their end region by means of a laser or other suitable means so that the conductors are exposed in order to be connected to a plug or the like. How this is performed is not described.

A method based on laser technology was developed by the applicant, which solved the aforementioned problems and which led to technologically defect-free windows in the FFC. An application for this method has been filed separately from the present application. The present application concerns an arrangement of at least two lasers, between which there is an FFC, in which a window is to be formed. The arrangement of two aligned lasers oriented one in front of the other for the production of windows in FFCs is given due to the fineness of the window and the requirement of forming windows on both sides. During processing, when the work moves between the stripping of the top side and the stripping of the bottom side on the FFC, the necessary positioning accuracy is only achieved with disproportionately large expense and also only at low clock rates.

There is also the unpleasant problem that the FFC is moved between the stripping of the top side and the stripping of the bottom side and thus this method produces an offset in the edges of the windows.

It has also been stressed that despite all care for the control and regulation techniques, there is a residual risk that one of the two lasers can be activated when there is already a window in the FFC (or also when for some reason absolutely no FFC has been inserted), whereby the laser emits radiation directly into the other inactive laser and damages this laser.

The task of the invention is to solve these problems economically and reliably.

This is realized according to the invention in that in front of each laser there is a cover that is impervious to the laser beam and that is removed from the region of the laser beam only when the corresponding laser is activated.

In this way it is ensured that in front of the inactive laser there is always a cover that also then reliably prevents the penetration of the laser beam from the other laser, if, e.g., there is no FFC between the lasers or if there is an FFC with an already completely formed window.

In a preferred configuration, the cover of each laser consists of a rotating disk with corresponding holes or openings, wherein preferably the two disks are mounted for the two lasers on a common axis of rotation.

The invention is explained in more detail in the following with reference to the drawing. Shown are:

FIG. 1, an embodiment of the invention with rotary disks, and

Figure 2:
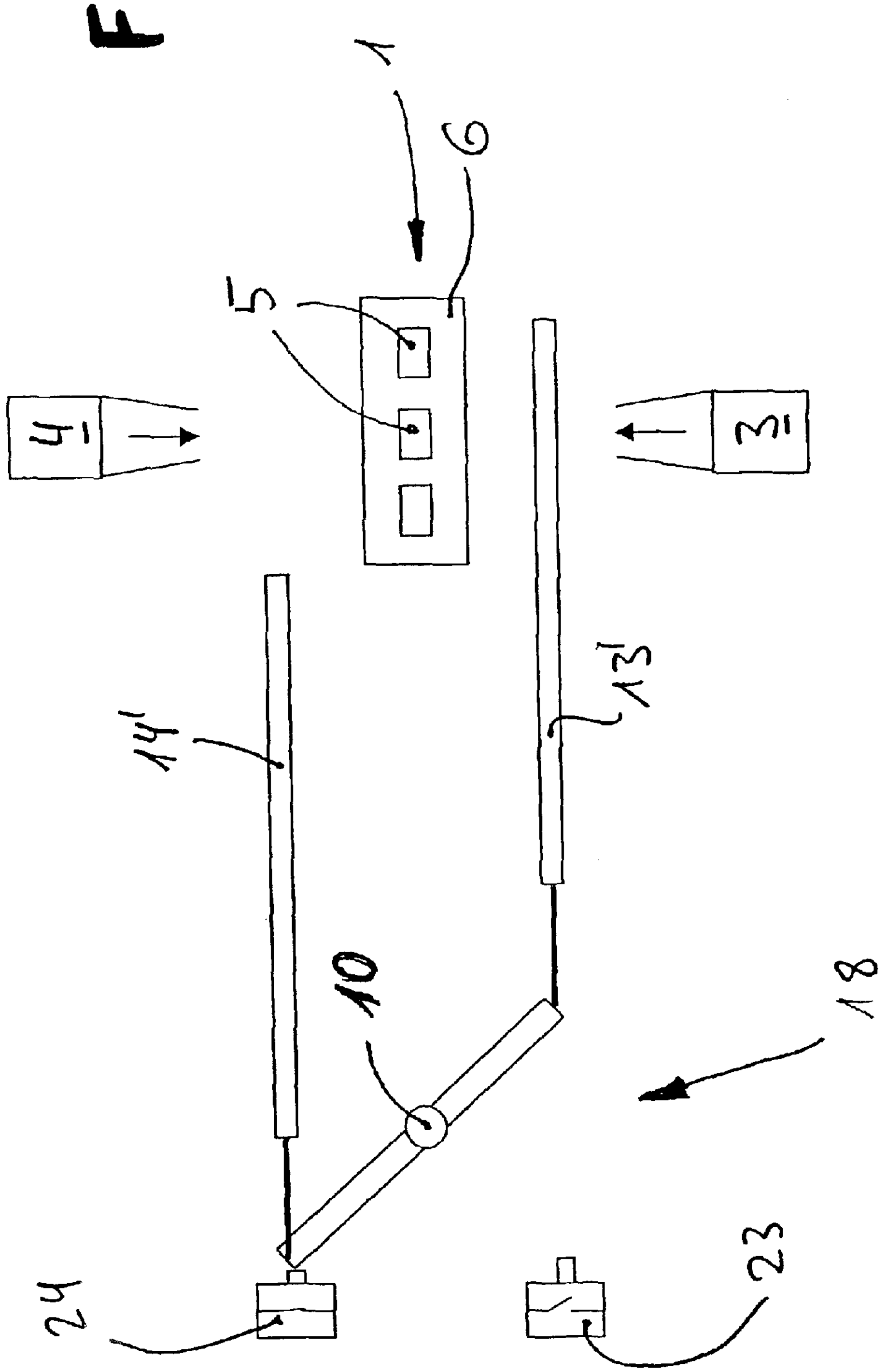

FIG. 2, an embodiment with covers moving back and forth.

FIG. 1 shows, purely schematically, an arrangement according to the invention. An FFC 1 is led through such a processing station and at the pints where a window 2 is to be formed, the cable is stopped in the region between two lasers 3, 4 and positioned and fixed in alignment in order to be able to produce the window 2 with the required geometrical accuracy.

The FFC 1 consists of several parallel conductors 5 running in a plane, of which only one is visible in FIG. 1 due to the direction of the section, and the extruded material 6, which surrounds the conductors and which is made from electrically insulating material that can deform plastically within limits.

The two lasers 3, 4, which are shown in FIG. 1 purely schematically and not according to their actual arrangement, are coaxial along an axis 7 and point towards each other. In most cases, the lasers are arranged at a small distance from the object and the laser beams are directed toward their target by means of a corresponding optical system (which can also include flexible optical fibers) and focused in alignment. The structures designated by 3 and 4, respectively, thus correspond to the earlier optical systems, but they obviously also belong to the laser in its extended sense. The lasers 3, 4 are moved simultaneously in the region of the window 2 to be formed in order to form the window with the desired size and shape.

As can be easily seen from FIG. 1, there is the risk that one of the two lasers 3, 4 is activated although there is no FFC 1 between the lasers, or although a window 2 already exists and there is no more extruded material between the lasers, and the lasers are directed onto an area in which there is no conductor 5. Because the window 2 has a greater surface area than the corresponding area of the conductors 5, this possibility exists also during normal operation. Because the two lasers and their optical systems must be built completely symmetrically, if a laser is activated in this situation, it will inevitably lead to damage or destruction of the inactive laser.

To prevent this situation, according to the invention, an interruption device designated in its entirety by 8 is arranged in the direct vicinity of FFC 1 and the lasers 3, 4. This essentially consists of a shaft 9, which is set in rotation by a (not-shown) motor, and which carries two cover disks 13, 14, which are each assigned to one of the lasers 3, 4. The rotor shaft 9 is essentially normal to the plane of the FFC 1 and is arranged relatively close next to the edge of the FFC 1. In this way, depending on the angular position of the rotor shaft 9, and thus the cover disks 13, 14, sections of these disks are located in front of the associated laser 3, 4 or not.

FIG. 1 shows each angular position in which the cover disk 13 is located in front of the laser 3, while the cover disk 14 exposes the laser 4, so that this laser can be activated. This alternating activation is preferably performed by means of switching, which is derived from the angular position of the axis of rotation 9 and thus the angular position of the cover disks 13, 14. In FIG. 1, this is shown schematically at the bottom end of the rotor shaft 9, where a switch 23 for the laser 3 and a switch 24 for the laser 4 are indicated.

Obviously, it is possible to provide gear-like structures instead of the eccentric cover disks 13, 14 and thus to produce a dynamically balanced situation at the desired high rpm. Similarly, it is possible to provide perforated disks instead of a gear-like construction, by means of which the same purpose is achieved. The switches 23, 24 obviously must not activate the lasers 3, 4 directly, instead they send corresponding signals to the actual control electronics for the two lasers. In any case, however, it is guaranteed by the provision of the device 8 that the two lasers 3, 4 cannot be damaged by each other.

In an analogous way, a modified construction 18 is shown in FIG. 2, which uses a reciprocal, linear motion of two cover disks 13', 14'. The guidance of the purely schematic section of FIG. 2 lies normal to the schematic section of FIG. 1, so that in this illustration it can be seen that the FFC 1 has several conductors 5 and how these are arranged relative to each other. The functioning of the safety device 18 uses the pivoting of a pivot lever 10, e.g., by a (not-shown) connecting rod of a motor or by an electromagnet, which acts directly on a corresponding ferromagnetic part of the cover disks 13', 14' or also by a pneumatic drive, and here also ensures that at least one of the disks is located in front of the corresponding laser. Through the correspondingly arranged switches 23, 24, the uncovered laser is released in terms of control for forming the desired window 2 in the FFC 1.

Obviously other configurations are also possible, e.g., configurations provided with several covers for each of the two lasers, which definitely can make the device larger and more complex, but which allows the speed of the moving parts to be reduced. In particular, the configuration according to FIG. 1 is advantageous and preferred.

From the knowledge of the invention or its basic concept, numerous modifications of the device for performing the method according to the invention are possible, which touch upon other movements:

The two covers (multiple covers are not explained in more detail) can sit on a common carriage, which undergoes reciprocal motion, which can be driven electrically, pneumatically, or also hydraulically, wherein one of the covers always comes into the region of the associated laser source and the other is removed from this region.

The two covers can also be arranged on the shell of a drum, in which the FFC runs along the drum axis, wherein the drum rotates about its axis. In this case, the drum can also be used to draw undesired vapors and gases produced during discharge of the extruded material, because they are either unpleasant or dangerous to human health.

All of these configurations and other unmentioned configurations are covered by the invention as defined in the claims.

What is claimed is:

1. Method for stripping flat cables, so called FFCs (1), particularly of extruded FFCs by means of laser beams, characterized in that two coaxial laser beams pointing toward each other are used for removing insulation, particularly extruded material, where the flat cable is located essentially in the plane of symmetry between two laser sources, and the two laser sources are activated in an alternating manner, and a cover that is impervious to the laser beams is arranged between the flat cable and the inactive laser source at least during the activation of one of the laser sources.

2. Method for stripping flat cables, so-called FFCs, particularly of extruded FFcs by means of laser beams, characterized in that two coaxial laser beams pointing toward each other are used for removing the insulation, particularly the extruded material, where the flat cable is located essentially in the plane of symmetry between two laser sources, and the two laser sources are activated in an alternating manner, a cover that is impervious to the laser beams is arranged between the flat cable and the inactive laser source at least during the activation of one of the laser sources, and the cover comprises two covers that are connected together mechanically so that in the course of their common movement, at least one of the covers is always located between the FFC and the corresponding laser source.

3. Device for, stripping extruded flat cables by means of laser beams, wherein two coaxial laser beams pointing toward each other are used for removing extruded material, where the flat cable is located essentially in the plane of symmetry between two laser sources, and the two laser sources are activated in an alternating manner, characterized in that two laser sources, optionally powered by a common laser, are positioned coaxially and diametrically opposite each other, where guiding and positioning devices for the flat cable to be stripped are provided essentially in the plane of symmetry between the two laser sources, and a control unit is provided, by means of which the two laser sources are activated in an alternating manner, and that on each side of the flat cable there is at least one cover, which is brought into the region of the corresponding laser source or removed from this region depending on the control unit.

4. Device according to claim 3, characterized in that the covers are arranged on a common rotating shaft and the activation of the laser sources is performed as a function of the angular position of the rotating shaft.

5. Device according to claim 3, characterized in that the covers are connected to a rocker, the covers being alternately pushed into and out of the region of the corresponding laser source by the back-and-forth motion of the rocker, and the activation of the laser sources being performed as a function of the angular position of the rocker.

6. Device according to claim 3, characterized in that the two covers are arranged on a common carriage and offset relative to each other in the direction of motion of the carriage, the activation of the laser sources being performed as a function of the position of the carriage.

* * * * *